United States Patent [19]

Versic et al.

[11] Patent Number: 5,234,732
[45] Date of Patent: Aug. 10, 1993

[54] TAMPER-INDICATING WRAPPERS

[75] Inventors: Ronald J. Versic; Donald D. Emrick, both of Dayton, Ohio

[73] Assignee: Philip Morris Inc., New York, N.Y.

[21] Appl. No.: 671,010

[22] Filed: Mar. 18, 1991

[51] Int. Cl.[5] .................. B65D 73/00; B32B 27/08
[52] U.S. Cl. ............................... 428/35.7; 428/43;
 428/323; 428/328; 428/497; 428/516; 428/517;
 428/520; 428/521; 428/915; 428/916; 428/918;
 206/459.1
[58] Field of Search ............... 428/918, 915, 916, 43,
 428/516, 497, 520, 517, 323, 521, 328, 35.7

[56] References Cited

U.S. PATENT DOCUMENTS

| | | | |
|---|---|---|---|
| 1,843,234 | 2/1932 | Karnes et al. | |
| 2,083,206 | 6/1937 | Schoeller | 154/46 |
| 3,152,950 | 10/1964 | Palmquist et al. | 428/915 |
| 3,288,343 | 11/1966 | Hyland, Jr. | 229/6 |
| 3,463,532 | 8/1969 | Chidley et al. | 292/307 |
| 3,640,750 | 2/1972 | Schutzner | 117/36.2 |
| 3,896,965 | 7/1975 | Cornell | 220/359 |
| 3,923,198 | 12/1975 | Brochman | 220/359 |
| 3,935,960 | 2/1976 | Cornell | 220/260 |
| 4,120,445 | 10/1978 | Carrier et al. | 229/53 |
| 4,289,830 | 9/1981 | Knott, II | 428/475.8 |
| 4,322,466 | 3/1982 | Tomlinson | 428/119 |
| 4,424,911 | 1/1984 | Resnick | 215/365 |
| 4,457,430 | 7/1984 | Darling et al. | 206/459 |
| 4,496,961 | 1/1985 | Devrient | 346/206 |
| 4,516,679 | 5/1985 | Simpson et al. | 206/459 |
| 4,643,122 | 2/1987 | Seybold | 116/206 |
| 4,755,405 | 7/1988 | Massucco et al. | 428/35 |
| 4,837,061 | 6/1989 | Smits et al. | 428/40 |
| 5,015,318 | 5/1991 | Smits et al. | 428/915 |

FOREIGN PATENT DOCUMENTS 0181632 11/1985 European Pat. Off.
57-131246 8/1982 Japan.

OTHER PUBLICATIONS

"Polyamide Resin Compositions for Packaging Films," *Chemical Abstracts* 98: 73340u (1983).
"Ethylene-Vinyl Alcohol Copolymer Gas Barrier Layer with Phenol Additive," *Chemical Abstracts* 95: 204995z (1981).
"Laminated Article," *Chemical Abstracts* 105: 61875x (1986).
"The Solubility Contours of Ethylene-Vinyl Acetate and Ethylene-Vinyl Alcohol Copolymers," *Chemical Abstracts* 98: 90294z (1983).
R. H. Foster, "Ethylene-vinyl Alcohol Copolymers," *Modern Plastics Encycl.*, 1988, p. 62.
"Tamper-evident Film Changes Color," *Modern Plastics*, vol. 64, No. 10, Oct. 1987, p. 28+.
"Stressful Solution to Product Tampering," *New Scientist*, Apr. 23, 1987, p. 31.
"New Tamper-Resistant Package Ideas," Plastics Engineering, vol. XLIII, No. 6, Jun. 1987, p. 15.
G. B. Latamore, "Better Drug Packaging Thwarts Saboteurs," *High Technology*, vol. 7, No. 6, Jun. 1987, pp. 59-60.
J. Holusha, "New Efforts to Foil Food Tampering," *The New York Times*, Dec. 30, 1987, p. D4.
F. E. Young, "FDA's Role in Food Safety and in Packaging Tampering," *Converting and Packaging*, Mar. 1988, pp. 212-215.

(List continued on next page.)

*Primary Examiner*—P. C. Sluby
*Attorney, Agent, or Firm*—John M. Hintz

[57] ABSTRACT

Tamper-indicating, laminated wrappers wherein a visible change between layers of the wrapper indicate that the wrapper has been punctured or that there has been tampering with the wrapper or its contents. The wrapper may be composed of two or more plies of packaging material such as films made from ethylene vinyl alcohol copolymer or from polyolefins such as polypropylene. In one construction, a transparent or translucent laminated wrapper becomes opaque upon rupture or puncture. In other constructions, a transparent or translucent wrapper becomes colored at the site of the rupture or puncture.

40 Claims, No Drawings

OTHER PUBLICATIONS

"Processing EVAL® Resins," Technical Bulletin No. 120, EVAL Company of America.

"Chemical and Solvent Barrier Properties of EVAL® Resins," Technical Bulletin No. 180, EVAL Company of America.

"SC-F Series 32 mol % Ethylene," EVAL Company of America.

R. O'Brien, "Unfolding the Future of Tamper-Evident Features: Devices that Protect your Package," *Food and Drug Packaging*, vol. 53, No. 10, Oct. 1989, p. 10+.

R. J. Koopmans, F. Vercauteren, R. Van der Linden, and E. F. Vansant, "The Solubility Contours of Ethylene Vinyl Acetate and Ethylene Vinyl Alcohol Copolymers," *Plast. Rubber Process, Appl.*, vol. 2, No. 4, 1982, pp. 305-308.

TAMPER-INDICATING WRAPPERS

BACKGROUND OF THE INVENTION

1. Field Of The Invention

The present invention relates to tamper-indicating wrappers. More particularly, this invention relates to multi-layer, laminated wrappers wherein a visible change between layers of the wrapper indicates that the wrapper has been punctured or that there has been tampering with the wrapper or its contents. The present invention also relates to bonding agents used with such wrappers.

2. Description Of Related Art

Various consumer goods are packaged in plastic wrappers for a multitude of purposes. For many consumer goods, such wrappers maintain the freshness and purity of the product. For others, the wrapper serves as a means to display the wrapped item or to present information about the item.

The use of plastic packaging materials has been greatly influenced by the recent instances of product tampering. Product tampering has led to the use of so-called tamper-proof or tamper-indicating seals for packaging consumer goods. These seals are generally applied by heat-shrinking or gluing plastic strips or plastic sheets over lids and cartons. These seals are only effective for extreme cases of tampering such as when the lid or carton is opened and the said is completely broken. The seals often cannot serve as indicators of minute ruptures or punctures, such as those made by a hypodermic needle. Additionally, for such seals to have any effectiveness, the consumer must be aware of and inspect the seal.

Various tamper-indicating structures are known. One type uses a transparent sheet that becomes opaque when subjected to stress. For example, U.S. Pat. No. 4,837,061 to Smits et al. discloses a laminated structure which delaminates when stressed, generating a color to indicate tampering. Similarly, U.S. Pat. No. 3,896,965 to Cornell discloses a tape closure with a layer containing microencapsulated color-forming material. Upon flexing, the encapsulated color-forming material is released, which generates color and indicates tampering.

Other tamper-indicating structures are made from bands of plastic material and used as security tags. For example, U.S. Pat. No. 3,463,532 to Chidley et al. discloses a tag in which dye-impregnated gauze is enclosed in a band of plastic material. The band is made so that there is an inherently weak seam extending around the length of the plastic band. Rupture of this band exposes the gauze to air and results in a tamper-indicating color change. A similar security tag is disclosed in U.S. Pat. No. 4,643,122 to Seybold. In this tag, a color change results, upon breakage of the tag and evaporation of a solvent.

U.S. Pat. No. 4,516,679 to Simpson et al. discloses another type of structure, namely a "Tamper-Proof Wrap." In this wrap, chemical layers are separated by layers of film. The chemicals may be absorbed into mats that are placed between film layers. Different constructions, such as three film layers and two mats and two film layers and one mat, are described. The chemicals may also be coated directly onto the film layers. When the wrap is punctured, the chemical layers come together to cause either a color change or the generation of heat or gas to swell, decompose, or discolor the wrap.

The most significant problem with prior tamper-indicating wrappers is that the wrappers are not transparent. As such, the usefulness of the wrappers is extremely limited. Furthermore, many of the these tamper-indicating structures are not sufficiently sensitive to detect minute ruptures or punctures such as may be made by a hypodermic needle.

Accordingly, it is an object of this invention to provide a reliable and inexpensive means of irreversibly indicating tampering with or rupture of transparent or translucent plastic packaging materials.

It is another object of this invention to provide a tamper-indicating wrapper made from materials that are substantially non-toxic and non-odorous such that the wrapper may be used with a host of consumable items such as medicines, food products, tobacco goods, and the like, and which may be applied to these consumer goods by conventional packaging methods.

It is a further object of this invention to provide a tamper-indicating wrapper made from multiple plies of packaging material in which the plies are laminated together by a substantially transparent bonding agent.

It is a still further object of this invention to provide a tamper-indicating wrapper that is sufficiently sensitive to detect minute ruptures such as those which result from penetration of the wrapper by a hypodermic needle.

It is a still further object of this invention to provide a tamper-indicating wrapper that provides consumers with an obviously apparent, easily visible change to indicate tampering.

It is a still further object of this invention to provide a bonding agent for use with ethylene vinyl alcohol films.

SUMMARY OF THE INVENTION

The present invention solves the problems associated with prior art wrappers by providing a tamper-indicating wrapper that is nearly transparent, substantially non-toxic and non-odorous, and sensitive to minute ruptures or punctures. Generally, the tamper-indicating wrappers of the invention comprise a laminate of two or more plies of plastic packaging material such as films made from ethylene vinyl alcohol (EVAL) or from polyolefins such as polypropylene. Various materials are disposed between the film layers of the laminate. Upon rupture or puncture of the laminate, a color change is produced indicating tampering.

In the preferred embodiment of this invention, a laminate is prepared from multiple layers of EVAL film. An alcohol-water mixture containing propyl gallate is disposed between the film layers of the laminate. Other phenols such as Bisphenol A may be used in conjunction with propyl gallate in the alcohol-water mixture. Upon rupture or puncture of the laminate, the alcohol-water mixture evaporates resulting in a color change. Where translucent films can be tolerated, the film laminate may incorporate a thin, porous ply of non-woven synthetic fabric, tulles or loose net fabric grids, cellulose paper, or any other such material located between the film layers of the laminate. These porous materials serve as reservoirs of chemical reagents so that there can be a potential for generating areas of color.

In another embodiment, a laminate is prepared from multiple layers of plastic films, a resinous bonding agent, and a reactive adduct of a dye containing a free amino functionality. The dye is preferably one approved for use with food, drugs, or cosmetics. The plastic film layers may be made from EVAL or polyolefins such as polypropylene. The resinous bonding agent may be mixed with a liquid plasticizer. The reactive dye adduct must exist in two distinct forms. For example, the reactive dye adduct may exist in a non-characteristically colored form and a characteristically colored form. Alternatively, the reactive dye adduct may exist in a colored form and a substantially colorless form. When used in a tamper-indicating wrapper, the reactive adduct is initially non-characteristically colored or substantially colorless. Upon puncture of the wrapper, a color change results from a chemical reaction between the reactive adduct of the dye and a hydroxyl source or an alkaloid base. This color change serves to indicate tampering.

In other embodiments, a color change is produced by a chemical reaction between at least two color-generating reagents, located between film layers of the laminate. In these embodiments, the color-generating reagents may be conveniently added to suitable adhesive mixtures or resinous bonding agents and then placed between film layers of the laminate. In making such laminates, at least three film layers are used to make a laminate: an inner layer, an intermediate layer, and an outer layer. One color-generating reagent is located between the inner layer and the intermediate layer; the other color-generating reagent is located between the outer layer and the intermediate layer. The intermediate layer thus keeps the color-generating reagents from coming into contact with each other. The film layers may be any suitable plastic film such as polyolefin or EVAL films. Each of the three layers may be made from the same or from different types of films. A thin porous ply may be placed between any of the layers of the laminate. Rupture or puncture of the laminate causes the color-generating reagents to come into contact and generate a visible color change indicating tampering.

In one of these embodiments, one color-generating reagent, a dye precursor, consists of a reactive adduct of a dye diluted in a resinous bonding agent. Preferably, the dyes are ones that are approved for use with food, drugs, or cosmetics. A second color-generating reagent, a dye developer, consists of a mixture of 1,2-propylene glycol and glycerol. Preferably, food grade 1,2-propylene glycol and food grade glycerol are used. The dye developer may also contain propyl gallate.

In another embodiment, the dye precursor consists of an iron or vanadium salt. Such salts may include: ferric benzoate, ferric palmitate, ferric chloride hydrate, ferric chloride alcoholate, ferric chloride glycolate, tetra butyl ammonium vanadate, or a vanadate derived from a sodium alkylaminopolyethoxyethyl sulfate such as Triton QS-15 (avalable from Rohm and Haas, Philadelphia, Pa.) In yet another embodiment, the dye precursor is a color-blocked dye such as those used in carbonless copy paper.

In preferred embodiments, the dye precursors are disposed between film layers of the laminate along with a resinous bonding agent. The resinous bonding agent also may be mixed with a liquid plasticizer.

The bonding agents and other chemicals that are located between the film layers of the laminates of this invention may be applied hot to the film layers. This application may be made by hot melt technology currently available and known to those skilled in the art. In the laboratory, the bonding agents and other chemicals may be applied by hand with a brush. Some of the mixtures, for example, those mixed with certain resinous bonding agents, must first be diluted with a solvent, such as toluene, and then brushed on the film layer. After this, the solvent must be allowed to evaporate before successive layers of film are applied to the tacky coated surface.

DETAILED DESCRIPTION OF THE PREFERRED EMBODIMENTS

A preferred tamper-indicating, substantially transparent wrapper of the present invention is preferably prepared from multiple layers of ethylene vinyl alcohol (EVAL) copolymer film. Although any number of layers of EVAL film may be used, two or three layers are preferred. In this preferred embodiment, an alcohol-water mixture containing propyl gallate in solution is applied to a layer of EVAL film. A second layer of EVAL film is then placed on this coated surface to create a laminate. Illustrative examples of such laminates are contained in Examples I, II, and III.

As an alternate embodiment, a second phenol may be dissolved in the alcohol-water mixture. This second phenol must be sufficiently polar (rich in oxygen, particularly hydroxyl) so that the EVAL films will be sufficiently bonded and so that the permeability of the EVAL films will not be adversely increased.

In selecting this second phenol, consideration must be given to the product that will eventually be contained in the tamper-indicating wrapper. For example, the following phenols could all be used: thymol, guaiacol, "Bisphenol A" (4,4'-isopropylidenediphenol), "butylated hydroxyanisole" ("BHA"; a mixture of 2- and 3-tertiary-butyl-4-methoxyphenols), or "(di)butylated hydroxytoluene" ("BHT"; 2,6-di-tert-butyl-4-methylphenol). However, in the case of wrappers to be used with food products, the second phenol should not be toxic, odorous, or reactive with the food products. Bisphenol A, BHA, or BHT are thus preferred for such uses.

Eutectic mixtures of phenolic compounds should be avoided. For example, in either a 70/30 weight ratio of n-propanol and water or a 75/25 weight ratio of ethanol and water, a solution of 23–25 weight percent propyl gallate with 25–27 weight percent Bisphenol A produces a low melting, eutectic composition involving the 1:1 molecular complex. This composition can melt too near ambient room temperature for the required growth of tamper-indicating opacity in an embodiment of this invention.

In selecting the alcohol to be used in the alcohol-water mixture, consideration also must be given to the ultimate use for the tamper-indicating wrapper. For example, when the tamper-indicating wrapper is to be used with food products, an alcohol that will not impart undesirable odors to the food should be used. The alcohol used in the alcohol-water mixture is thus preferred to be a low molecular weight alcohol such as isopropanol, n-propanol, or ethanol. Because of its low odor, ethanol is preferred for uses involving food products.

To prepare the film laminate, a hot solution (from about 55°–98° C.) of the alcohol-water mixture containing propyl gallate is applied to a first layer of EVAL film. This application may be made by any means known in the art such as by a blade coater, a roll coater, or a brush. On a laboratory scale, such application may be made by hand with a brush. A second layer of EVAL film is then placed on the coated surface of the first EVAL film. The resulting laminate is subjected to pressure sufficient to eliminate air bubbles and wrinkles or pressure and gentle heat (from about 55°-120° C.). During this step or as a separate step, the edges of the laminate may be sealed such as by the application of separate resinous sealing strips. Such strips may be similar to those referred to in U.S. Pat. No. 4,516,679 to Simpson et al. The edges of the laminate also may be sealed by the application of pressure or pressure and heat through the use of pinch rollers as is known in the art.

If more than two layers of EVAL film are desired, the steps described above would be repeated. Thus, a two-layer laminate would be prepared, one surface of this two-layer laminate would be coated with an alcohol-water mixture containing propyl gallate, and a third layer of EVAL film would be placed on this coated surface in the same manner as previously described. By repeating these steps, laminates of ever-increasing layers can be prepared.

A laminate prepared by the foregoing methods may be used as a tamper-indicating wrapper. In such a use, if the laminate is punctured, such as by a hypodermic needle, the alcohol and water in the alcohol-water mixture evaporate through the puncture opening. As the alcohol-water mixture evaporates, the propyl gallate or the propyl gallate-rich mixture of phenols begins to crystallize. This crystallization produces an opaque area that is visible in the EVAL film laminate. As more and more of the alcohol-water mixture evaporates, the opaque area increases in size or area. A dye may be incorporated into the laminate to enhance the appearance of the opaque area.

As is evident from the manner the opaque area is generated, relative impermeability of the film laminate is essential. If the film layer is not sufficiently impermeable, the alcohol-water mixture will slowly evaporate through the film layer and result in the formation of an opaque area in the absence of any rupture or puncture. This consideration also necessitates that the edges of the laminate be sealed, e.g., by sealing strips or pinch rollers, as previously mentioned. Any such premature evaporation, either through the laminate or from the edges of the laminate, would provide a false indication of product tampering or rupture of the packaging material. Given these considerations, EVAL films bonded together by propyl gallate or propyl gallate-rich phenolic mixtures are particularly suited for use in film laminates because of their relatively high impermeability to water vapor and vapors of low molecular weight alcohols.

Where translucent films can be tolerated, the laminates described above may incorporate thin, porous plies of non-woven synthetic fabric, tulles or loose net fabric grids, cellulose paper, or any other such material. These thin, porous plies may be coated with the alcohol-water mixture containing propyl gallate and placed between the layers of EVAL film. Alternatively, the alcohol-water mixture containing propyl gallate may be applied to one of the films and then the thin, porous ply may be placed between the layers of EVAL film. These porous materials serve as reservoirs of chemical reagents so that there can be a potential for generating areas of color.

In another embodiment, a laminate is made from two adjacent layers of EVAL films or polyolefin films or between an EVAL film and a polyolefin film. Located between the two layers of EVAL film are a resinous bonding agent and a reactive adduct of a dye containing a free amino functionality. Preferably, the dye would be one approved for use with food, drugs, or cosmetics. Examples of wrappers of this embodiment are given below in Examples IX through XXII, generally under the heading "Two Layer Laminate".

The resinous bonding agents used with this embodiment may act as a dispersant for the reactive adduct of the dye and at the same time serve as adhesives for bonding the film layers together. Suitable resinous bonding agents include various polyvinyl acetates, poly(2-ethylhexyl acrylates) or methacryl-ates, poly(isobutyl acrylates) or methacrylates, polyiso-butylenes, styrene-butadiene copolymers, non-hydroxylated lower polyisoprenes, ester gum (glycerol rosinate), and ester gum-rich mixtures with rosin. Each of these resinous bonding agents may also be mixed with about 5 to about 100 percent (about 15 to about 35 percent is preferred) liquid plasticizer in order to promote pliability of the resultant laminate. Suitable liquid plasticizers include diethyl phthalate, diethyl sebacate, or diethyl adipate. The preferred resinous bonding agent is ester gum or a plasticized mixture of ester gum.

The reactive adduct of the dye that is selected should be one that exists in two distinctly colored forms or in a colored form and a substantially colorless form. When used in a tamper-indicating wrapper, the reactive adduct is initially non-characteristically colored or substantially uncolored. For packaging intended for use with food, drugs, or cosmetics, it is of course preferred that the reactive dye adduct will be selected from dyes approved for use with food, drugs, or cosmetics. For the purposes of this invention, suitable reactive adducts of food, drug, or cosmetic dyes include: FD&C Blue No. 1 (Brilliant Blue FCF; C.I. #42090), FD&C Green No. 3 (Fast Green FCF; C.I. #42053), D&C Blue No. 4 (Erioglaucine; C.I. #42090), D&C Violet No. 2 (Alizarin Violet; C.I. #60730), and FD&C Yellow No. 5 (Tartrazine; C.I. #19140). Although not approved for food, drug, or cosmetic use, the anhydrous non-characteristically colored reactive adducts of dyes such as Oil Blue N (Solvent Blue 141; C.I. #6555), non-carcinogenic Sudan Yellow 150 (Solvent Yellow 150; C.I. #11021), and Methylene Blue (Basic Blue 9; C.I. #52015) are also suitable.

A laminate so prepared may be used as a tamper-indicating wrapper. In such a use, if the laminate is punctured such as by a hypodermic needle, tampering will be indicated by the appearance of a color adjacent the puncture. The color change results from a reaction between the reactive adduct of the dye and a hydroxyl source or alkaloid base. The hydroxyl source may be moisture-containing air that enters through the puncture opening or possibly a substance on the hypodermic needle. In instances of tampering, such substances would ordinarily be present as solvents such as water, alcohol, and glycerol. Alkaloid bases capable of causing the color change could be present as the substance being introduced by the tamperer, e.g., strychnine. Each of these would be sufficient to cause the color-change reaction.

In the remaining embodiments of this invention, a color change reaction is produced by a reaction between at least two color-generating reagents. Examples of these embodiments are contained in Examples IX through XXX, generally under the heading "Three Layer Laminate." In these embodiments, the color-generating reagents are diluted in suitable adhesive mixtures or resinous bonding agents and then placed between layers of the tamper-indicating wrapper.

In such wrappers, at least three layers of film are used to make a laminate: an inner layer, an intermediate layer, and an outer layer. The laminate is prepared by placing one of the color-generating reagents, e.g., the dye precursor, between the inner layer and the intermediate layer and by placing the other color-generating reagent, e.g., the dye developer, between the intermediate layer and the outer layer. In this construction, the intermediate layer keeps the color-generating reagents from coming into contact with each other. The layers of the laminate may be made from any suitable plastic film such as an EVAL or polyolefin film. Preferably, all the layers are the same type of film, but this is not critical. In fact, it may be desirable to use different types of films in one or more of the layers. It may also be desirable to place a thin porous ply such as those previously described between any two of the layers of the laminate. These porous materials serve as reservoirs of chemical reagents so that there can be a potential for generating areas of color.

In these remaining embodiments utilizing dye co-reagents, the dye developer will also preferably function as an adhesive to bond the film layers between which it is located. Preferred dye developers that perform the dual function of reacting with the dye precursor and serving as an adhesive mixture include: propyl gallate; a propyl gallate-rich mixture of propyl gallate and a polar phenolic material; mixtures of food grade propyl gallate in a non-toxic glycerol and 1,2-propylene glycol; and propyl gallate, glycerol, and 1,2-propylene glycol mixtures thickened with either polyvinyl alcohol or ethylene vinyl alcohol copolymer. The adhesive mixtures should be melted and applied hot (100°–140° C.), but at temperatures less than the melting points of the film to which they are being applied.

When EVAL films are used, polymeric thickening additives are probably unnecessary. However, when polyolefin-based films such as polypropylene films are used, it is necessary to use an adhesive mixture that has been thickened with polyvinyl alcohol or ethylene vinyl alcohol. For thickened mixtures, the amount of polyvinyl alcohol or ethylene vinyl alcohol used should be that amount sufficient to thicken and firmly gel the mixture at room temperature (20–°30° C.). From about 2 percent to about 5 percent polyvinyl alcohol is preferred.

When the layers of laminate are punctured, such as by a hypodermic needle during tampering, or when the layers are ruptured, either intentionally or accidentally, the color-generating reagents come into contact. This contact causes the color-generating reagents to react and generate a visible color change. This color change serves as a tamper-indicating feature for a wrapper made in this manner.

In one of the embodiments utilizing dye co-reagents, the dye precursor consists of a reactive adduct of a dye diluted in a resinous bonding agent. The dyes and resinous bonding agents used can be the same as those previously listed. The dye developer consists of a mixture of food grade 1,2-propylene glycol and food grade glycerol. Examples of this type of wrapper are contained in Examples X through XIV.

Preferred dye developers contain propyl gallate. In the absence of propyl gallate, and particularly when polyolefin films are used, the dye developer preferably contains about 2 to about 5 percent of dissolved polyvinyl alcohol (87–89 percent hydrolyzed type) as a thickener to insure better bonding of the polyolefin films. It is often desirable to use propyl gallate as it seems to improve the bonding of EVAL films and to facilitate the dissolution of ethylene vinyl alcohol copolymer and the resulting thickening of glycol mixtures by such copolymers. In such uses, the propyl gallate also appears to keep the 1,2-propylene glycol and glycerol mixture relatively clear (transparent) at room temperature. If desired, Bisphenol A and BHA may be added to replace up to 55 percent and up to 35 percent, respectively, of the relatively expensive propyl gallate.

In the most preferred embodiment, a thin, porous ply of cellulose-based tissue or a coating of finely divided cellulose (flock), wood flour, starch, dextrin, or polyvinyl alcohol should be placed along with the dye precursor between the film layers. These materials are useful in preventing reversion of the color of the dye after a reaction between the reactive dye adduct and the hydroxyl source has taken place. Without such materials located between the film layers, there is a risk that the tamper-indicating color will disappear or revert to its original state, that is, colorless, substantially colorless, or alternatively colored. Such a reversion would limit the duration of the tamper-indicating feature of this invention. This may be important where, for example, the tamper-indicating wrapper is being used with a product that has a long shelf-life.

In making laminates of this embodiment, the dye precursor (a reactive dye adduct in a resinous bonding agent) and the dye developer (the glycol-glycerol mixture) would all be applied to the film layers while hot (100°–140° C.). Alternatively, one or more of these materials could be applied while hot to one or more porous plies of cellulose-based tissue laying on one or more films. These applications would be made by hot melt technology currently available and known to those skilled in the art, followed by bonding with pressurized rollers. In the laboratory, the dye developer may be applied by hand with a brush. However, the presence of the resinous bonding agent in the dye precursor makes simple brush application of the dye precursor difficult. Thus, the hot resinous bonding agent containing the reactive adduct of the dye must first be diluted with a solvent, such as toluene, and then brushed on the surface of the film or porous ply to be coated. After this, the solvent must be allowed to evaporate before successive layers of film are applied to the tacky coated surface.

In another embodiment, the dye precursor consists of an iron or vanadium salt. Such salts may include: ferric benzoate, ferric palmitate, ferric stearate, ferric chloride hydrate, ferric chloride alcoholate, ferric chloride glycolate, tetra butyl ammonium vanadate, or a vanadate derived from a sodium alkylaminopolyethoxyethyl sulfate such as Triton QS-15 (available from Rohm and Haas, Philadelphia, Pa). Ferric benzoate is preferred. Examples of these types of wrappers are contained in Examples IV through VIII. Laminates of this embodiment are made in the same manner as those previously described in which at least three layers of films are used. Also, one or more thin, porous plies may be placed between the film layers as previously described.

In yet another embodiment, the dye precursor is a color-blocked dye such as those used in carbonless copy paper. Examples of this embodiment are in Examples XXIII through XXIX. Manufacture of these laminates containing at least three film layers, and the possible use of thin, porous plies between the film layers, is the same as that described in the foregoing.

In each of the foregoing embodiments where two or more color-generating co-reagents are used, the color-generating reagents must be selected so that upon rupture or puncture of the wrapper, a chemical reaction between the co-reagents, caused by the mixing of the two previously separated color-generating reagents, will generate a tamper-indicating color change. Furthermore, the presence of porous materials between the plies serving as reservoirs of chemical reagents provides for the potential for generating relatively large areas of color.

The following examples present specific methods of preparing film laminates. These examples are illustrations of, rather than limitations to, the present invention.

In each of the examples commercially available ethylene vinyl alcohol copolymer (32 mole percent ethylene) EF-XL biaxially oriented F-grade (food grade) film obtained were used. These films were obtained from the EVAL Company of America Inc. ("EVALCA"), a division of U.S.I. Chemical Company (Lisle, Ill.). These films had an average measured thickness of 0.535 mils or 13.6 microns.

In each of the examples, the needle used to puncture the film laminates was a 21 gauge hypodermic needle. Also, in each of the examples, all chemical reagents were of the regular red label grade obtained from Aldrich Chemical Company (Milwaukee, Wis.) except for the following:

"technical grade abietic acid" (or "rosin") was obtained from Pfaltz and Bauer, Inc. (Waterbury, Conn.);

"Ester Gum 8D-SP" (glycerol rosinate) was obtained from Hercules, Inc. (Wilmington, Del.);

"EVAL resin" or "EVAL copolymer" refers to SC-F series of EVAL F101A resin (32 mole percent ethylene) obtained from EVALCA;

"polypropylene film" refers to thinly coated No. 44-190A biaxially oriented polypropylene film obtained from Mobil Chemical Company (Film Division, Pittsford, N.Y.) with an average measured thickness of 0.73 to 0.75 mils or 18.5 to 19.0 microns;

"thin cellulose tissue" refers to a single-ply of KLEENEX brand tissue made by Kimberly-Clark Corporation (Neenah, Wis.) with an average measured thickness of 1.02 mils or 25.9 microns;

"VINOL 540" refers to VINOL 540 polyvinyl alcohol (87-89 percent hydrolyzed type) obtained from Air Products Company (Allentown, Pa.);

"monomeric adducting agent A" refers to a proprietary monomeric adducting agent A of moderate molecular weight obtained from the Dayton Tinker Corporation (Dayton, Ohio);

"Elvacite 2014" refers to Elvacite 2014 (methyl methacrylate-2-ethyl hexyl acrylate copolymer) obtained from DuPont (Wilmington, Del.);

"VINAC B-15" refers to VINAC B-15 granules of low viscosity polyvinyl acetate obtained from Air Products and Chemical Company (Allentown, Pa.);

"CopiKem XIV" and "CopiKem XX" refer to non-toxic and non-carcinogenic CopiKem XIV (3,4-diethylaminophenyl)-3-[N,N-bis(4-octylphenyl)-amino]phthalide); $C_{49}H_{56}N_2O_2$) and CopiKem XX (3,3-bis (1-butyl-2-methylindol-3-yl) phthalide); $C_{34}H_{36}N_2O_2$) obtained from Hilton Davis Chemical Company (a subsidiary of Sterling Drug Company, Cincinnati, Ohio);

"polybutadiene resin" refers to polybutadiene resin obtained from Arco Specialty Chemicals (Arco Chemical Company, Philadelphia, Pa.);

"Isolene 400VIS" refers to Isolene 400VIS low molecular weight polyisoprene obtained from Hardman Company (Bellville, N.J.); and "Pergascript Black I-BR Xanthene dye-precursor" is a color-blocked dye obtained from Ciba-Geigy Corporation (Greensboro, N.C.).

EXAMPLE I

A 50 weight-percent solution of propyl gallate in a 75/25 weight ratio mixture of ethanol and water was heated to about 75° C. and brushed onto a first layer of EVAL film. A second layer of EVAL film was then placed on the coated surface of the first layer of EVAL film. Heat (from about 55°-78° C.) and pressure sufficient to eliminate air bubbles and wrinkles were applied. Upon puncture of the resulting laminate with a clean dry needle, a readily apparent opaque spot developed after several days.

EXAMPLE II

The procedure described in Example I was repeated except that a 37.5 weight percent propyl gallate/12.5 weight percent Bisphenol A solution in a 75/25 weight ratio mixture of ethanol and water was used. Upon puncture of the resulting laminate with a clean dry needle, a readily apparent opaque spot developed after several days.

EXAMPLE III

The procedure described in Example I was repeated except that a 33.3 weight percent propyl gallate/16.7 weight percent BHA solution in a 75/25 weight ratio mixture of ethanol and water was used. Upon puncture of the resulting laminate with a clean dry needle, a readily apparent opaque spot developed after several days.

EXAMPLE IV 1.0 grams of ferric benzoate was dissolved and/or dispersed in a mixture of 20 grams of technical grade of abietic acid and 20 milliliters of toluene. The resulting solution and/or suspension was brushed on a thin sheet of cellulose tissue laying on a first EVAL film. After air drying for about 60 minutes to evaporate the toluene, a second EVAL film was placed on the tacky surface of the coated tissue. A hot (100°-20° C.) 50/31/19 solution-mixture of propyl gallate/glycerol/1,2-propylene glycol was then brushed on the second EVAL film. A third EVAL film was placed on the coated surface of the second EVAL film. Heat and pressure were applied to produce an almost transparent, amber-colored laminate.

When the laminate was punctured through with a clean dry needle, black spots quickly appeared in the vicinity of the puncture hole. Within 20 hours, the black spots grew to about 25 to 60 square millimeters in area.

EXAMPLE V

The procedure described in Example IV was followed except that ferric palmitate was used instead of ferric benzoate. The resulting laminate was hazy with a number of pale amber-opaque regions. When the laminate was punctured through with a clean dry needle, black spots 60 to 170 square millimeters in area appeared within 20 hours.

EXAMPLE VI 0.8 grams of ferric benzoate was dissolved and/or dispersed in a mixture of 40 grams of Ester Gum 8D-SP and 40 milliliters of toluene. The resulting solution and/or suspension was brushed on a thin cellulose tissue laying on a first EVAL film. After air drying for about 45 minutes to evaporate off most of the toluene, a second EVAL film was placed on the tacky surface of the coated tissue. A hot (100°-120° C.) 50/31/19 solution-mixture of propyl gallate/glycerol/1,2-propylene glycol was then brushed on the second EVAL film. A third EVAL film was placed on the moist, coated surface of the second EVAL film. The product was then pressed and heated to produce a nearly transparent, amber-colored laminate.

When the laminate was punctured through with a clean dry needle, grayish-black coloration spots rapidly appeared. These spots grew to 9 to 16 square millimeters in area, in one case to 144 square millimeters, within 20 hours.

EXAMPLE VII 1.9 grams of ferric benzoate was dissolved and/or dispersed in a mixture of 21.6 grams of Ester Gum 8D-SP, 32.4 grams of technical grade abietic acid, 9.1 grams of diethyl phthalate and 45 milliliters of toluene. The resulting solution and/or suspension was brushed on a thin cellulose tissue laying on a first EVAL film. After air drying for one hour, a second EVAL film was placed on the tacky surface of the coated tissue. A hot (120°-140° C.) approximately 4.9/44.7/23.3/23.3/2.9 mixture of VINOL 540/propyl gallate/1,2-propylene glycol/glycerol/water mixture was brushed on the second EVAL film. A third EVAL film was placed on the moist, coated surface of the second EVAL film. The product was subjected to heat and pressure to produce a nearly transparent, pale amber laminate.

When the laminate was punctured through with a clean dry needle, grayish colored spots quickly appeared in the vicinity of the puncture holes. Within 20 hours, the grayish spots grew into black spots of 2 to 9 square millimeters in area.

EXAMPLE VIII

In this example polypropylene films were substituted for the first and third EVAL films of Example VII. Thus, the layers of the laminate were polypropylene/EVAL/polypropylene. The same glycol and resinous mixture used in Example VII was used.

When the resulting film laminate was punctured through with a clean dry needle, grey spots quickly appeared in the vicinity of the puncture holes. Within 24 hours, these grey spots grew into dark black spots of 2 to 12 square millimeters in area.

EXAMPLE IX

A. Two Layer Laminate

With the aid of vigorous stirring and heating (to about 100°-110° C.), 0.25 grams of FD&C Green No. 3 dye and 6.5 milliliters of a toluene solution containing 0.79 grams of monomeric adducting agent A, were combined with a solution of 25.0 grams of Ester Gum 8D-SP in 67.1 grams of diethyl phthalate so as to produce an anhydrous amber-green suspension of the dye adduct. This warm suspension was brushed on a thin cellulose tissue laying on a first EVAL film. A second EVAL film was placed on the moist, coated tissue.

The resulting laminate exhibited great sensitivity to puncturing through with a needle moistened with either water or a lower alcohol.

B. Three Layer Laminate

The procedure described in Part A was followed to prepare a two layer laminate. Then a hot approximately 2.1/16.6/10/13.3 weight ratio of VINOL 540/glycerol/1,2-propylene glycol/water mixture was brushed on the second EVAL film. A third EVAL film was placed on the moist, coated surface of the second EVAL film. Rolling pressure was applied to produce a pale, amber-green almost transparent laminate. This laminate was difficult to handle because of edge leakiness.

When this laminate was punctured through with a clean dry needle, blue-green coloration, with some delamination of the laminate, appeared in the vicinity of the puncture holes. Within about 19 hours, these colored areas grew to 36 to 100 square millimeters in area.

EXAMPLE X

A. Two Layer Laminate

With the aid of vigorous stirring and heating, 0.25 grams of FD&C Green No. 3 dye and 6.5 milliliters of a toluene solution containing 0.79 grams of monomeric adducting agent A were combined with a solution of 25.0 grams of Aldrich Chemical Company's low molecular weight polyvinyl acetate (pellets; Ford No. 4 viscosity of 13-14.5 seconds at 25° C.) in 50 milliliters of diethyl adipate so as to produce an anhydrous suspension of the dye adduct. This warm suspension was brushed on a thin cellulose tissue laying on a first EVAL film. A second EVAL film was placed on the wet, coated tissue.

The resulting laminate was very sensitive to puncturing through with a needle moistened with water or alcohol.

B. Three Layer Laminate

The procedure described in Part A was followed to prepare a two layer laminate. Then a hot (100°-125° C.) 50/31/19 weight ratio mixture of propyl gallate/glycerol/1,2-propylene glycol was brushed on the second EVAL film. A third EVAL film was placed on the moist, coated surface of the second EVAL film. Rolling pressure was applied to produce an almost transparent, light green-colored laminate. This laminate had noticeable edge leakiness.

After hanging the product in a vertical position for eight days, it was punctured through with a clean dry needle. Blue-green coloration appeared in the vicinity of the puncture holes. Within 24 hours, these areas of coloration grew to 16 to 36 square millimeters in area.

EXAMPLE XI

The procedure described in Example X, Part B was followed except that the propyl gallate/glycerol/1,2-propylene glycol solution was brushed on a second thin cellulose tissue laying on the second EVAL film. The third EVAL film was then applied over the moist, coated second tissue. When this laminate was punctured through with a clean dry needle, areas of blue-green color appeared. Within 24 hours, these areas of coloration grew to 3 to 25 square millimeters in area.

EXAMPLE XII

A. Two Layer Laminate

With the aid of vigorous stirring and heating, 0.25 grams of FD&C Green No. 3 dye and 6.5 milliliters of a toluene solution containing 0.79 grams of monomeric adducting agent A were combined with a solution of 25.0 grams of Elvacite 2014 in 50 milliliters of diethyl adipate so as to achieve suspension of the anhydrous dye adduct. This hot suspension was brushed on a thin cellulose tissue laying on a first EVAL film. A second EVAL film was applied to the coated tissue.

This laminate rapidly generated large blotches of blue-green color upon puncturing through with a needle moistened with water or alcohol.

B. Three Layer Laminate

The procedure described in Part A was followed to prepare a two layer laminate. Then a hot 50/31/19 weight ratio of propyl gallate/glycerol/1,2-propylene glycol was then brushed on the second EVAL film. A third EVAL film was placed over the moist, coated surface of the second EVAL film. Rolling pressure was then applied to produce a reasonably translucent lightgreen colored laminate. This laminate had noticeable edge leakiness.

After hanging the laminate in a vertical position for eight days, the laminate was punctured with a clean dry needle. A blue-green coloration appeared in the vicinity of the holes from dry needle puncturing. Within 24 hours, this coloration grew to about 1 to 9 square millimeters in area.

EXAMPLE XIII

A. Two Layered Laminate

With vigorous stirring and heating, 0.25 grams of FD&C Green No. 3 dye and 6.5 milliliters of a toluene solution containing 0.79 grams of monomeric adducting agent A were combined with a solution of 50.0 grams of Ester Gum 8D-SP in 50 milliliters (50.45 grams) of diethyl adipate. This hot suspension was brushed on a thin cellulose tissue laying on a first EVAL film. A second EVAL film was placed on the surface of the coated tissue.

Large areas of blue-green color were rapidly produced upon puncturing through with a needle moistened with water or alcohol.

B. Three Layer Laminate

The procedure described in Part A was followed to prepare a two layer laminate. Then a hot 50/31/19 weight ratio of propyl gallate/glycerol/1,2-propylene glycol was brushed on the second EVAL film. A third EVAL film was placed on the moist, coated surface of the second EVAL film. Rolling pressure was then applied to produce a pale, ambergreen translucent laminate. This laminate showed edge leakiness.

After suspending the laminate in a vertical position for seven days, it was punctured through with a clean dry needle. Blue-green coloration appeared in the vicinity of the puncture holes. Within about 24 hours, these areas grew to 64 to 400 square millimeters in area.

EXAMPLE XIV

The procedure described in Example XIII, Part B was followed except that a second thin cellulose tissue was placed between the second and third EVAL films. After suspending the laminate in a vertical position for seven days, colored areas of 36 to 150 square millimeters in area appeared within 24 hours after dry needle puncturing.

EXAMPLE XV

A. Two Layer Laminate

With vigorous stirring and heating, 0.25 grams of FD&C Blue No. 1 dye and 6.5 milliliters of a toluene solution containing 0.79 grams of monomeric adducting agent A were combined with a solution of 37.5 grams of VINAC B-15 granules in 50 milliliters (48.1 grams) of diethyl sebacate to produce an anhydrous suspension of the dye adduct. The hot suspension was brushed on a thin cellulose tissue laying on a first EVAL film. A second EVAL film was placed on the surface of the coated tissue. Upon puncturing with a needle moistened with water or alcohol, areas of bluegreen color quickly appeared.

B. Three Layer Laminate

The procedure described in Part A was followed to prepare a two layer laminate. Then a hot 50/31/19 propyl gallate/glycerol/1,2-propylene glycol suspension was brushed on the surface of the second EVAL film. A third EVAL film was placed on the coated surface of the second EVAL film. A pale-amber, almost transparent laminate was obtained. This laminate showed noticeable edge leakiness.

The laminate was suspended vertically for seven days and then punctured through with a clean dry needle. Blue spots quickly appeared in the vicinity of the puncture hole. Within 4 hours, these spots grew to 9 to 64 square millimeters in area.

EXAMPLE XVI

The procedure described in Example XV, Part B was followed except that a second thin cellulose tissue was used between the second and third EVAL films. The laminate was suspended vertically for seven days and then punctured through with a clean dry needle. Within 4 hours, blue spots of 4 to 25 square millimeters in area appeared.

EXAMPLE XVII

A. Two Layer Laminate

With the aid of vigorous stirring and heating, 0.25 grams of FD&C Blue No. 1 and 6.5 milliliters of a toluene solution containing 0.79 grams of monomeric adducting agent A were combined with 50 grams of Ester Gum 8D-SP and 50 milliliters (48.1 grams) of diethyl sebacate to produce a suspension of the dye adduct. The hot suspension was brushed on a thin cellulose tissue laying on a first EVAL film. A second EVAL film was placed on the surface of the coated tissue. Upon puncturing with a needle moistened with water or alcohol, large areas of blue color quickly appeared.

B. Three Layer Laminate

As in Examples XIV, XV, and XVI, a 50/31/19 hot propyl gallate/glycerol/1,2-propylene glycol suspension was used to prepare a multi-ply laminate. The laminate was nearly transparent, and it was a pale ambergreen color. The laminate had noticeable edge leakiness. The laminate was suspended vertically for seven days and then punctured through with a clean dry needle. Within 4 hours, blue spots of 81 to 196 square millimeters in area appeared.

EXAMPLE XVIII

The procedure described in Example XVII, Part B was followed except that a second thin cellulose tissue was used between the second and third EVAL films. The laminate was suspended vertically for seven days, and then punctured through with a clean dry needle. Within 4 hours, blue spots of 16 to 64 square millimeters in area appeared.

EXAMPLE XIX

A. Two Layer Laminate

With the aid of vigorous stirring and heating, 0.28 grams of FD&C Blue No. 1 dye and 7 milliliters of a toluene solution containing 0.85 grams of monomeric adducting agent A were combined with 50.0 grams of Ester Gum 8D-SP, 17 milliliters (16.4 grams) of diethyl sebacate, and 30 milliliters of toluene to produce a very fine dispersion of the dye adduct. This suspension was brushed on a thin cellulose tissue laying on a first EVAL film. After nearly all of the toluene was allowed to evaporate into the air, a second EVAL film was placed on the tacky surface of the coated tissue.

Large areas of blue color rapidly appeared when the laminate was punctured through with a needle moistened with alcohol or water.

B. Three Layer Laminate

The procedure described in Part A was followed to prepare a two layer laminate. Then a hot 50/31/19 weight ratio of propyl gallate/glycerol/1,2-propylene glycol mixture was brushed on the coated surface of the second EVAL film. Heat and pressure were applied to produce a nearly transparent, very pale amber-green colored laminate. The laminate showed less edge leakiness than the laminates of previous examples and, therefore, was not as messy to handle.

Upon puncturing the laminate with a dry needle, blotches of blue color quickly appeared which gradually increased in area to 36 to 100 square millimeters after 15 hours (to 144 to 360 square millimeters after 14 days).

EXAMPLE XX

A. Two Layer Laminate

With the aid of vigorous stirring and heating, 0.29 grams of FD&C Green No. 3 dye and 7 milliliters of a toluene solution containing 0.85 grams of monomeric adducting agent A were combined with 50.0 grams of Ester Gum 8D-SP and 40 milliliters of toluene to produce a fine dispersion of the dye adduct. This dispersion was brushed on a thin cellulose tissue laying on a first EVAL film. After air drying for about 60 minutes to allow the toluene to evaporate, a second EVAL film was placed over the tacky surface of the coated tissue.

Moderate to small areas of blue-green color rapidly appeared upon puncturing through the laminate with a needle moistened with either water or an alcohol.

B. Three Layer Laminate

The procedure described in Part A was followed to prepare a two layer laminate. Then a hot 50/31/19 weight ratio of propyl gallate/glycerol/1,2-propylene glycol mixture was brushed on the second EVAL film. A third EVAL film was then placed on the moist, coated surface of the second EVAL film. Heat and pressure were applied to produce a fairly clear translucent, very pale green colored laminate. As in Example XIX above, the product showed relatively less edge leakiness and was not very messy upon handling.

Upon puncturing through the laminate with a clean dry needle, blue-green blotches appeared in the vicinity of the puncture holes. Within 16 hours, these blotches grew to 9 to 25 square millimeters in area.

EXAMPLE XXI

A. Two Layer Laminate

With the aid of vigorous stirring and heat, 0.30 grams of FD&C Blue No. 1 dye and 7.5 milliliters of a toluene solution containing 0.9 grams of monomeric adducting agent A were mixed with 8.1 milliliters (9.1 grams) of diethyl phthalate, 21.5 grams of Ester Gum 8D-SP and 32.4 grams of technical grade abietic acid to produce a fine suspension of the dye adduct. This solution was then brushed on a thin cellulose tissue laying on a first EVAL film. After air drying for 80 minutes, a second EVAL film was placed on the tacky surface of the coated tissue.

Upon puncturing through the laminate with a needle moistened either with water or an alcohol, moderate areas of blue color quickly appeared.

B. Three Layer Laminate

The procedure described in Part A was followed to prepare two layer laminate. Then a 40 weight percent solution of propyl gallate in 1,2-propylene glycol was brushed on the surface of the second EVAL film. A third EVAL film was then placed on the moist, coated surface of the second EVAL film. Heat and pressure were applied to produce an almost clear pale-amber-green laminate.

Upon puncturing through the product with a clean dry needle, blue spots quickly appeared in the vicinity of the puncture holes. Within 45 minutes, these spots rapidly grew to 4 to 16 square millimeters in area. Within 18 hours, these spots grew to 6 to 25 square millimeters in area.

EXAMPLE XXII

A. Two Layer Laminate

With the aid of vigorous stirring and heating, 0.15 grams of FD&C Blue No. 1 dye and 3.75 milliliters of a toluene solution containing 0.45 grams of monomeric adducting agent A were combined with 27.0 grams of Ester Gum 8D-SP and 4.55 grams of diethyl phthalate so as to produce a fine suspension of the dye adduct. This suspension was brushed on a thin cellulose tissue laying on a first polypropylene film. After air drying for about an hour, a second polypropylene film was placed over the tacky surface of the coated tissue.

Blue colored areas of moderate size rapidly appeared upon puncturing the laminated product with a needle moistened with either an alcohol or water.

B. Three Layer Laminate—Polypropylene/EVAL/Polypropylene

The procedure described in Part A was followed except that an EVAL film was placed over the coated tissue. Then a hot mixture (120°–140° C.) of 5/46/24.5/24.5/3 weight ratio of VINOL 540/propyl gallate/1,2-propylene glycol/glycerol/water was then quickly brushed on the EVAL film. A second polypropylene film was then placed over the warm, tacky surface of the EVAL film. Upon applying heat and pressure, a nearly transparent pale yellow/green laminate was produced.

When this laminate was punctured through with a dry needle, blue spots appeared. Within 24 hours, these spots increased to 3 to 16 square millimeters in area.

C. Three Layer Laminate—EVAL Films

The procedure described in Part B was followed except that all three film layers of the laminate were EVAL films. A laminate of this construction achieved about the same color-generating results after puncturing with a dry needle as the laminate of Part B.

EXAMPLE XXIII

A solution of 0.33 grams each of CopiKem XIV and CopiKem XX were dissolved in 20 grams of Ester Gum 8D-SP and 20 grams of Ester Gum 8D-SP and 20 milliliters of toluene. This solution was then brushed on a thin cellulose tissue laying on a first EVAL film. After air drying for 70 minutes, a second EVAL film was placed on the tacky surface of the tissue coating. A warm (100°–120° C.) 50/31/19 mixture of propyl gallate/glycerol/1,2-propylene glycol was brushed on the surface of the second EVAL film. A third EVAL film was then placed on the moist, coated surface of the second EVAL film. Heat and pressure were applied to produce a nearly colorless, almost transparent, film laminate.

Upon piercing through the laminate with a clean dry needle, pink spots quickly appeared in the vicinity of the puncture holes. Within about 20 hours, these pink spots grew to red-colored areas of 9 to 25 square millimeters in area.

EXAMPLE XXIV

The procedure described in Example XXIII was followed except that the same amounts of mixed phthalide dye precursors were dissolved in 20 grams of technical grade abietic acid and 20 milliliters of toluene instead of Ester Gum 8D-SP. A pale pink colored opalescent laminate containing many hazy spots was produced. Upon puncturing through the laminate with a clean dry needle, red spots of 9 to 64 square millimeters in area appeared within about 20 hours.

EXAMPLE XXV

Separate studies indicated that reasonably good bonding with the production of nearly clear laminates having no areas of opalescent haziness could be prepared from 20/80, 40/60, 50/40, or 80/20 weight ratio mixtures of Ester Gum and technical grade abietic acid, respectively.

A. Fast-Developing Laminates

Accordingly, 0.7 grams each of CopiKem XIV and CopiKem XX were dissolved in a hot mixture of 45 grams of a 40/60 weight ratio of Ester Gum 8D-SP and technical grade abietic acid, together with 45 milliliters of toluene. Following the same procedure as in Example XXIII, this solution and a hot 50/31/19 mixture of propyl gallate/1,2-propylene glycol/glycerol were used to produce a laminate from three EVAL films and a thin cellulose tissue. The resulting laminate was almost transparent with a very pale pinkish color. When this laminate was punctured through with a clean dry needle, red spots quickly appeared. Within about 50 hours, these spots grew to about 36 to 81 square millimeters in area.

B. Slow-Developing Laminates

The procedure described in Part (A) was followed except that the propyl gallate glycerol syrup was placed on the thin cellulose tissue instead of the resinous mixture of Ester Gum and technical grade abietic acid. The resulting laminate was noticeably slower to develop color following needle puncture, and the pink spots grew to only about 4 to 10 square millimeters in area after 28 hours (no further growth after 28 hours).

EXAMPLE XXVI 0.59 grams each of CopiKem XIV and CopiKem XX were dissolved in 19 grams of a 40/60 weight mixture of Ester Gum 8D-SP/technical grade abietic acid, 3.2 grams of diethyl phthalate, and 19 milliliters of toluene. The resulting toluene solution was brushed on a thin cellulose tissue laying on a first EVAL film. After air drying for 140 minutes, a second EVAL film was placed on the tacky surface of the coated tissue. A hot 40 weight percent solution of propyl gallate in 1,2-propylene glycol was brushed on the surface of the second EVAL film. A third EVAL film was placed on the moist, coated surface of the second EVAL film. Pressure and heat were applied to produce a nearly transparent, very pale pink laminate. Upon puncturing through the laminate with a clean dry needle, red spots rapidly appeared. After only 45 minutes, these spots grew to 16 to 25 square millimeters in area, and after 18 hours, to 40 to 70 square millimeters in area.

EXAMPLE XXVII

The procedure described in Example XXVI was followed except that a 44/36/10 weight ratio of propyl gallate/1,2-propylene glycol/glycerol was used in place of the 44 percent solution of propyl gallate in 1,2-propylene glycol.

When the laminate was punctured through with a clean dry needle, red spots of 8 to 25 square millimeters in area appeared within 3 hours. These spots grew further within 24 hours.

EXAMPLE XXVIII 1.0 grams of each of CopiKem XIV and CopiKem XX were dissolved in a hot mixture of 14 grams of polybutadiene resin and 42 grams of Ester Gum 8D-SP. The resultant hot very viscous solution was rapidly spread onto a first polypropylene film. A thin cellulose tissue was placed on the hot, tacky surface of the first polypropylene film and a second polypropylene film was placed over the thin cellulose tissue. A hot solution of EVAL copolymer/propyl gallate/1,2-propylene glycol/glycerol was prepared in a 7.4/40.7/33.1/10.2 ratio by heating, refluxing, and stirring. The hot (120°–140° C.), viscous gallate-glycol mixture was brushed on the surface of the second polypropylene film. A third polypropylene film was placed on top of the moist, coated surface of the second polypropylene film. Heat and pressure were applied to produce a nearly transparent laminate.

Upon puncturing the laminate with a clean dry needle, pink spots quickly appeared in the vicinity of the puncture holes. After 18 hours, these holes grew to red spots of 3 to 7 square millimeters in area.

EXAMPLE XXIX 0.86 grams of each of CopiKem XIV and CopiKem XX were dissolved in a hot (125°–135° C.) mixture of Isolene 400VIS and 34.5 grams of Ester gum 8D-SP. The hot (130° C.) viscous mixture was rapidly applied to a first polypropylene film. A thin cellulose tissue was placed over the hot tacky coated surface of the first polypropylene film. A second polypropylene film was placed over the thin cellulose tissue. Heat and pressure were applied to squeeze out the surplus resin. A hot (120° C.) viscous 7.4/40.7/33.1/10.2 weight ratio of EVAL copolymer/propyl gallate/1,2-propylene glycol/glycerol mixture was brushed on the surface of the second polypropylene film. A third polypropylene film was placed on the tacky, coated surface of the second polypropylene film. Pressure and heat were applied to prepare a nearly transparent laminate.

When the resulting laminate was punctured through with a clean dry needle, pink spots quickly appeared. After 16 hours, these spots became red and grew to about 3 to 7 square millimeters in area.

EXAMPLE XXX

A 4 weight percent solution of Pergascript Black I-BR Xanthene dye-precursor in 20 grams of Ester Gum 8D-SP, plus 20 milliliters of toluene was substituted in Example XXIII for the corresponding mixed solution of CopiKem XIV and CopiKem XX phthalide dye-precursor solution. A laminate was then prepared following the procedure described in Example XXIII.

When the resulting laminate was punctured through with a clean dry needle, black spots appeared in the vicinity of the puncture holes. These spots grew to about the same size in area as those of Example XXIII.

We claim:

1. A tamper-indicating wrapper comprising first and second ethylene vinyl alcohol or polyolefin film layers having disposed therebetween as a coating an alcohol-water mixture containing propyl gallate.

2. The tamper-indicating wrapper of claim 1 wherein the alcohol-water mixture also contains a phenol selected from the group consisting of thymol, guaiacol, 4,4'-isopropylidenediphenol a mixture of 2- and 3-tertiary-butyl-4-methoxyphenols and 2,6-di-tert-butyl-4-methylphenol.

3. The tamper-indicating wrapper of claim 1 wherein the alcohol-water mixture contains from about 20 to about 60 weight percent propyl gallate.

4. The tamper-indicating wrapper of claim 3 wherein the alcohol-water mixture also contains from about 0 to about 25 weight percent of a phenol selected from the group consisting of thymol, guaiacol, 4,4'-isopropylidenediphenol a mixture of 2- and 3-tertiary-butyl-4-methoxyphenols and 2,6-di-tert-butyl-4-methylphenol (BHT).

5. A tamper-indicating wrapper comprising first and second ethylene vinyl alcohol or polyolefin film layers having disposed therebetween as a coating a resinous bonding agent and a reactive dye adduct selected from the group consisting of FD&C Blue No. 1, C.I. #42090; FD&C Green No. 3, C.I. #42053; D&C Blue No. 4, C.I. #42090; D&C Violet No. 2, C.I. #60730; and FD&C Yellow No. 5, C.I. #19140.

6. The tamper-indicating wrapper of claim 5 wherein the resinous bonding agent is selected from the group consisting of ester gum (glycerol rosinate), ester gum-rich mixtures with rosin, polyvinyl acetate, methyl methacrylate-2-ethyl hexyl acrylate copolymer, poly(2-ethylhexyl) acrylates), poly(2-ethylhexyl methacrylates), poly(isobutyl acrylate), poly(isobutyl methacrylates), polyisobutylene, non-hydroxylated lower polyisoprenes, and mixtures thereof.

7. The tamper-indicating wrapper of claim 6 wherein the reactive dye adduct is selected from the group consisting of FD&C Blue No. 1, C.I. #42090; FD&C Green No. 3, C.I. #42053; D&C Blue No. 4, C.I. #4290; D&C Violet No. 2, C.I. #60730; and FD&C Yellow No. 5, C.I. #19140.

8. A tamper-indicating wrapper comprising:
a first alkylene vinyl alcohol or polyolefin film layer;
a second ethylene vinyl alcohol or polyolefin film layer;
a third ethylene vinyl alcohol or polyolefin film layer;
a dye precursor dispersed in a resinous bonding agent;
a hydroxyl source capable of developing said dye precursor after contact therewith;
said dye precursor disposed as a coating between the first film layer and the second film layer; and
said hydroxyl source disposed as a coating between the second film layer and the third film layer.

9. The tamper-indicating wrapper of claim 8 wherein the hydroxyl source is selected from the group consisting of propyl gallate, glycerol, 1,2-propylene glycol, an alcohol, water, and mixtures thereof.

10. The tamper-indicating wrapper of claim 9 wherein the resinous bonding agent is selected from the group consisting of ester gum (glycerol rosinate), ester gum-rich mixtures with rosin, polyvinyl acetate, methyl methacrylate-2-ethyl hexyl acrylate copolymer, poly(2-ethylhexyl) acrylates), poly(2-ethylhexyl methacrylates), poly(isobutyl acrylate), poly(isobutyl methacrylate), polyisobutylene, non-hydroxylated lower polyisoprenes, and mixtures thereof.

11. The tamper-indicating wrapper of claim 8 wherein the reactive dye adduct is selected from the group consisting of FD&C Blue No. 1, C.I. #42090; FD&C Green No. 3, C.I. #42053; D&C Blue No. 4, C.I. #42090; D&C Violet No. 2, C.I. #60730; and FD&C Yellow No. 5, C.I. #19140.

12. The tamper-indicating wrapper of claim 11 wherein the hydroxyl source is selected from the group consisting of propyl gallate, glycerol, 1,2-propylene glycol, an alcohol, water, and mixtures thereof.

13. The tamper-indicating wrapper of claim 11 wherein the resinous bonding agent is selected from the group consisting of ester gum (glycerol rosinate), ester gum-rich mixtures with rosin, polyvinyl acetate, methyl methacrylate-2-ethyl hexyl acrylate copolymer, poly(2-ethylhexyl) acrylates), poly(2-ethylhexyl methacrylates), poly(isobutyl acrylate), poly(isobutyl methacrylate), polyisobutylene, non-hydroxylated lower polyisoprenes, and mixtures thereof.

14. The tamper-indicating wrapper of claim 13 wherein the hydroxyl source is selected from the group consisting of propyl gallate, glycerol, 1,2-propylene glycol, an alcohol, water, and mixtures thereof.

15. The tamper-indicating wrapper of claim 9 wherein the dye precursor is a ferric compound.

16. The tamper-indicating wrapper of claim 15 wherein the ferric compound is selected from the group consisting of ferric benzoate, ferric palmitate, ferric stearate, ferric chloride hydrate, ferric chloride alcoholate, ferric chloride glycolate, and mixtures thereof.

17. The tamper-indicating wrapper of claim 15 wherein the resinous bonding agent is selected from the group consisting of ester gum (glycerol rosinate), ester gum-rich mixtures with rosin, polyvinyl acetate, methyl methacrylate-2-ethyl hexyl acrylate copolymer, poly(2-ethylhexyl acrylates), poly(2-ethylhexyl methacrylates), poly(isobutyl acrylate), poly(isobutyl methacrylate), polyisobutylene, non-hydroxylated lower polyisoprenes, and mixtures thereof.

18. The tamper-indicating wrapper of claim 17 wherein the hydroxyl source is selected from the group consisting of propyl gallate, glycerol, 1,2-propylene glycol, an alcohol, water, and mixtures thereof.

19. The tamper-indicating wrapper of claim 18 wherein the hydroxyl source also contains a phenol selected from the group consisting of thymol, guaiacol, 4,4'-isopropylidenediphenol a mixture of 2- and 3-tertiary-butyl-4-methoxyphenols and 2,6-di-tert-butyl-4-methylphenol (BHT).

20. The tamper-indicating wrapper of claim 19 wherein the phenol is present at a concentration of from about 0 to about 25 weight percent.

21. The tamper-indicating wrapper of claim 15 wherein the hydroxyl source is selected from the group consisting of propyl gallate, glycerol, 1,2-propylene glycol, an alcohol, water, and mixtures thereof.

22. The tamper-indicating wrapper of claim 21 wherein the hydroxyl source also contains a phenol selected from the group consisting of thymol, guaiacol, 4,4'-isopropylidenediphenol a mixture of 2- and 3-tertiary-butyl-4-methoxyphenols and 2,6-di-tert-butyl-4-methylphenol.

23. The tamper-indicating wrapper of claim 22 wherein the phenol is present at a concentration of from about 0 to about 25 weight percent.

24. The tamper-indicating wrapper of claim 8 wherein the dye precursor is a vanadium compound.

25. The tamper-indicating wrapper of claim 24 wherein the vanadium compound is tetra butyl ammonium vanadate.

26. The tamper-indicating wrapper of claim 24 wherein the resinous bonding agent is selected from the group consisting of ester gum (glycerol rosinate), ester gum-rich mixtures with rosin, polyvinyl acetate, methyl methacrylate-2-ethyl hexyl acrylate copolymer, poly(2-ethylhexyl acrylates), poly(2-ethylhexyl methacrylates), poly(isobutyl acrylate), poly(isobutyl methacrylate), polyisobutylene, non-hydroxylated lower polyisoprenes, and mixtures thereof.

27. The tamper-indicating wrapper of claim 26 wherein the hydroxyl source is selected from the group consisting of propyl gallate, glycerol, 1,2-propylene glycol, an alcohol, water, and mixtures thereof.

28. The tamper-indicating wrapper of claim 27 wherein the hydroxyl source also contains a phenol selected from the group consisting of thymol, guaiacol, 4,4'-isopropylidenediphenol a mixture of 2- and 3-tertiary-butyl-4-methoxyphenols and 2,6-di-tert-butyl-4-methylphenol.

29. The tamper-indicating wrapper of claim 28 wherein the phenol is present at a concentration of from about 0 to about 25 weight percent.

30. The tamper-indicating wrapper of claim 24 wherein the hydroxyl source is selected from the group consisting of propyl gallate, glycerol, 1,2-propylene glycol, an alcohol, water, and mixtures thereof.

31. The tamper-indicating wrapper of claim 30 wherein the hydroxyl source also contains a phenol selected from the group consisting of thymol, guaiacol, 4,4'-isopropylidenediphenol a mixture of 2- and 3-tertiary-butyl-4-methoxyphenols and 2,6-di-tert-butyl-4-methylphenol.

32. The tamper-indicating wrapper of claim 31 wherein the phenol is present at a concentration of from about 0 to about 25 weight percent.

33. The tamper-indicating wrapper of claim 9 wherein the dye precursor is a color-blocked dye.

34. The tamper-indicating wrapper of claim 33 wherein the resinous bonding agent is selected from the group consisting of ester gum (glycerol rosinate), ester gum-rich mixtures with rosin, polyvinyl acetate, methyl methacrylate-2-ethyl hexyl acrylate copolymer, poly(2-ethylhexyl acrylates), poly(2-ethylhexyl methacrylates), poly(isobutyl acrylate), poly(isobutyl methacrylate), polyisobutylene, non-hydroxylated lower polyisoprenes, and mixtures thereof.

35. The tamper-indicating wrapper of claim 34 wherein the hydroxyl source is selected from the group consisting of propyl gallate, glycerol, 1,2-propylene glycol, an alcohol, water, and mixtures thereof.

36. The tamper-indicating wrapper of claim 35 wherein the hydroxyl source also contains a phenol selected from the group consisting of thymol, guaiacol, 4,4'-isopropylidenediphenol a mixture of 2- and 3-tertiary-butyl-4-methoxyphenols and 2,6-di-tert-butyl-4-methylphenol.

37. The tamper-indicating wrapper of claim 36 wherein the phenol is present at a concentration of from about 0 to about 25 weight percent.

38. The tamper-indicating wrapper of claim 33 wherein the hydroxyl source is selected from the group consisting of propyl gallate, glycerol, 1,2-propylene glycol, an alcohol, water, and mixtures thereof.

39. The tamper-indicating wrapper of claim 38 wherein the hydroxyl source also contains a phenol selected from the group consisting of thymol, guaiacol, 4,4'-isopropylidenediphenol a mixture of 2- and 3-tertiary-butyl-4-methoxyphenols and 2,6-di-tert-butyl-4-methylphenol.

40. The tamper-indicating wrapper of claim 39 wherein the phenol is present at a concentration of from about 0 to about 25 weight percent.

* * * * *

UNITED STATES PATENT AND TRADEMARK OFFICE
CERTIFICATE OF CORRECTION

PATENT NO. : 5,234,732
DATED : August 10, 1993
INVENTOR(S) : Ronald J. Versic et al.

It is certified that error appears in the above-indentified patent and that said Letters Patent is hereby corrected as shown below:

Column 20, line 13, "alkylene" should be -- ethylene --.

Column 20, line 62 "9" should be -- 8 --.

Column 22, line 19 "9" should be -- 8 --.

Signed and Sealed this

Twenty-sixth Day of July, 1994

Attest:

BRUCE LEHMAN

Attesting Officer        Commissioner of Patents and Trademarks